Oct. 22, 1940.   O. A. ROSS   2,218,721
CONTROL APPARATUS FOR MOTOR DRIVEN VEHICLES
Filed May 14, 1936
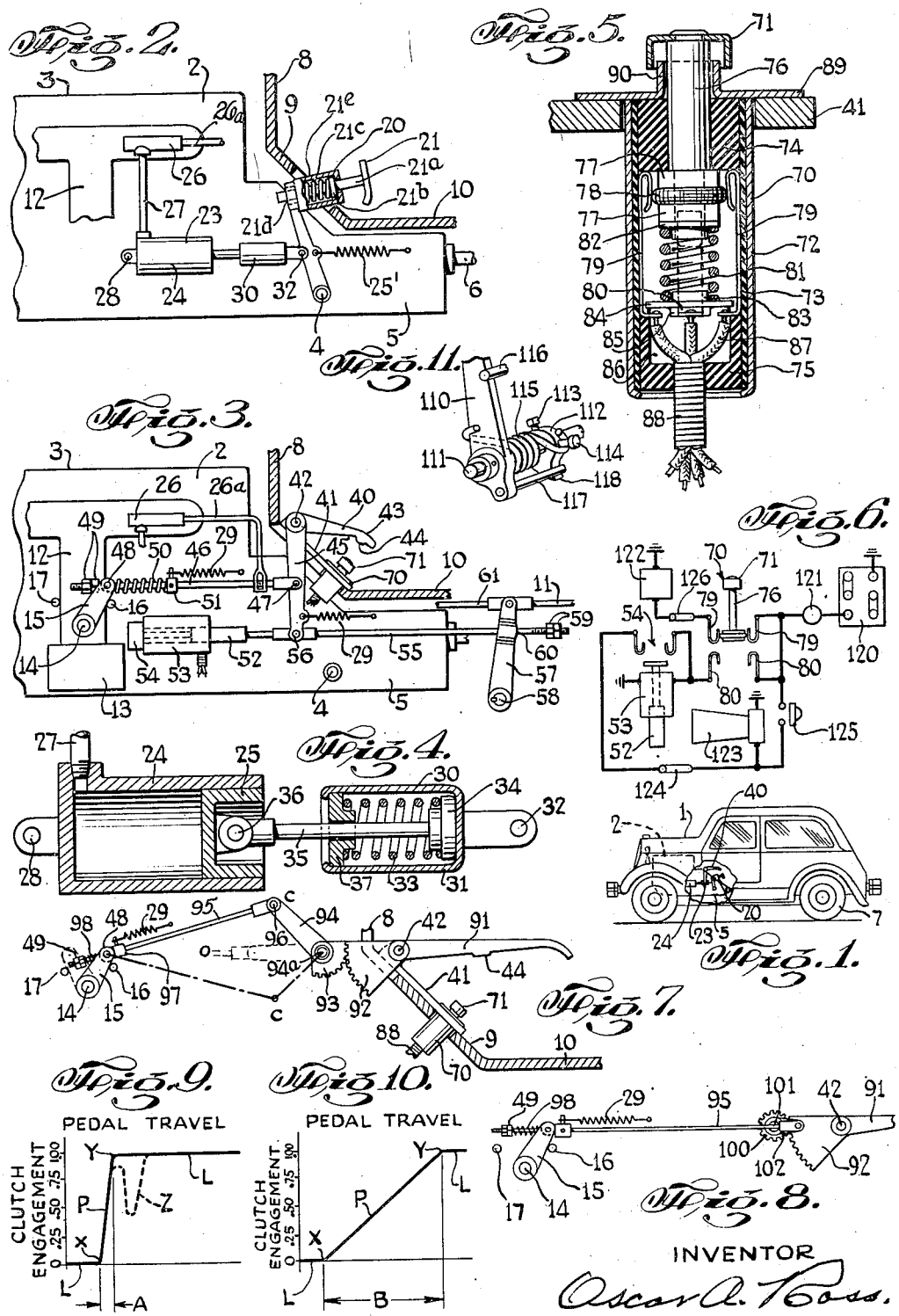
INVENTOR
Oscar A. Ross.

Patented Oct. 22, 1940

2,218,721

UNITED STATES PATENT OFFICE 2,218,721

CONTROL APPARATUS FOR MOTOR DRIVEN VEHICLES

Oscar A. Ross, New York, N. Y.

Application May 14, 1936, Serial No. 79,803

11 Claims. (Cl. 192—.01)

This invention relates to self-propelled vehicles and more particularly to that form propelled by a hydro-carbon motor.

The clutch between the motor and transmission of present motor-driven vehicles, whether operated by a foot pedal or a power operated device has the disadvantage that the period between initial and full engagement of said clutch represents a comparatively small portion of the operating stroke of said pedal or power operated device, and therefore unless the pedal or power operated device is operated at a comparatively slow rate through this portion of said stroke, the clutch grabs or locks causing a jerking forward of the vehicle with a possible stalling of the motor. This invention comprehends overcoming this difficulty by materially lengthening that portion of the stroke of the pedal or power operated device which represents the difference between the point of the initial engagement and the point of full engagement of the clutch thereby softening the transmission of power from the engine to the vehicle when starting, at the same time permitting a substantially constant movement of said pedal or power operated device during the clutch engagement operation.

The lengthening of the stroke portion of said pedal or power operated device corresponding to the period of clutch engagement also reduces the tension on the part of operators who use the pedal in preference to a power operated device for engaging and disengaging the clutch, since the clutch pedal may be comparatively quickly moved from disengaged to engaged position without causing a jerking forward of the vehicle, or stalling of the engine.

Furthermore, while driving vehicles, operators often meet emergencies and become confused, at which time they depress the accelerator pedal very hard believing it to be the brake pedal, and therefore, instead of preventing an accident they increase its hazards. This invention comprehends inter-connecting the accelerator pedal of a vehicle, the ignition apparatus thereof and the braking system thereof whereby upon abnormal depression of an accelerator pedal the ignition is cut off and the brakes are applied.

The invention further comprehends novel control of the motor or engine throttle valve by the accelerator pedal whereby said throttle valve is maintained in the idling position at both the released and fully depressed positions, and is moved to the full open position during the movement of said accelerator pedal from released to fully depressed positions, the accelerator pedal also being arranged to control the brake mechanism of the vehicle supporting said accelerator pedal.

The invention further comprehends novel and peculiar circuits and apparatus for accomplishing the aforesaid.

Other advantages and novel features of the invention will be apparent as the description thereof progresses and the novel structure is pointed out therein, and wherein:

Figure 1 is a side elevational view of a motor vehicle supporting the various embodiments of the invention, and Fig. 2 is a part sectional view of the same showing the clutch control thereof and Fig. 3 is also a part sectional view of said vehicle showing a combined throttle valve and brake mechanism control, and Fig. 4 is a sectional view in detail showing part of the clutch controlling mechanism, and Fig. 5 is a sectional view of a circuit controller employed on said vehicle, and Fig. 6 is a circuit plan employed on said vehicle, and Fig. 7 is a part sectional view of a modified form of throttle valve and brake control, and Fig. 8 is still another modified view of the same, and Figs. 9 and 10, are charts showing the difference between the engagement of present clutches and the engagement of a clutch operated in accordance with this invention, and Fig. 11 is a modified balancing unit.

Referring to Figs. 1, 2 and 3 vehicle 1 includes a power generating and transmission unit 2 including the usual motor 3 clutch (not shown) arranged to be disengaged upon counter clockwise rotation of shaft 4 and engaged by clock-wise rotation thereof, and transmission unit 5 driving propeller shaft 6 arranged to rotate rear wheels 7. Said vehicle further includes dashboard portion 8 and floor board portions 9 and 10. Said vehicle further includes a braking mechanism, the brakes of which are arranged to be operated upon movement of rod 11 to the left. Motor 3 includes inlet manifold 12 carburetor 13 and throttle valve shaft 14 arranged to move the throttle valve to the idling or closed position when lever 15 engages stop 16 and move to the full open position when said lever engages stop 17.

Clutch shaft 4 is normally rotated clock-wise to the engaged position of the clutch by a comparatively powerful spring, not shown, foot pedal 20 secured thereto being shown in the engaged position. Spring 25' having one end thereof fixed to said vehicle and the other end secured to said pedal is merely for the purpose of taking up the lost motion in the clutch mechanism after said clutch has been engaged by pedal 20 and thereby preventing the rattling of these parts while said vehicle is being operated. Whereas the clutch pedal may be depressed by the foot extension 21 said pedal as shown is preferably operated by a power operated device 23 comprising vacuum cylinder 24 having piston 25 operating therein and moved to the left under the influence of vacuum from manifold 12 controlled by valve 26 and flowing through pipe 27, the cylinder 24 being pivotally mounted on pin 28. Vacuum controlling valve 26 may be of the form disclosed in Patent No. 1,470,272 to Belcia, dated Oct. 9, 1923, the valve operating rod 26a being connected to throttle valve operating rod 40 for movement by accelerator pedal 40.

Said power operated device 23 further includes a balancing unit 30 comprising a housing 31 pivotally secured to pedal lever 20 by pin 32 and in which is positioned tensioned compression spring 33 one end of which engages allocating portion 34 of connecting rod 35 the other end of which is pivotally secured to piston 25 by pin 36, the opposite end of said spring impinging on allocating washer 37 secured to housing 30.

Throttle valve lever 15 is controlled by accelerator pedal 40 pivoted to bracket 41 by pin 42. Accelerator 40 comprises foot depressing portion 43 having boss 44 arranged to engage button 71 of circuit controller 70 secured to bracket 41 and also includes operating lever portion 45 having one end of a link connection secured thereto by pin 47 and the other end thereof slidable in boss 48 pivoted to lever 15. Adjustable nuts 49 normally engage boss 48 through spring 50, one end of which impinges against collar 51 secured to rod 46 and the other end of which engages boss 48, thereby tending to move rod 46 to the right and affecting engagement of nuts 49 with boss 48. To the lower end of lever 45 is pivotally secured armature 52 arranged to be moved to the left into solenoid 53 when said solenoid is energized. Said movement being arranged to jointly move link 55 also pivoted to lever 45 by pin 56 also serving to pivotally support armature 52 to the left, said link being slidable through brake operating lever 57 arranged to operate the brake mechanism of said vehicle through rod 11, lever 57 being pivotally supported on pin 58. Rod 55 is supplied with adjustable nuts 59 arranged to engage boss 60 of lever 57 for the movement thereof to the left and thereby apply said brakes. Armature 52 is also arranged to establish a circuit in circuit closer 54 as more fully hereinafter described. Brake rod 11 is also arranged to be operated by link 61 actuated by the usual brake pedal not shown, a suitable lost motion mechanism being interposed between said brake lever and rod 61 whereby said lever may remain stationary when said rod is moved to the left.

Referring to Fig. 5, circuit controller 70 comprises metal casing or sleeve 72 supporting insulating sleeve 73 and insulating bushing 74 at the upper end and insulating bushing 75 at the lower end thereof. Plunger unit 76 comprises dirt protecting cap or button 71 secured to the exposed end thereof, the opposite end supporting insulating collars 77 clampably allocating circuit bridging member or ring 78 arranged to establish a circuit through contact members 79—79 in the upper position thereof and contact members 80—80 in the lower position thereof, only one of said last named members being shown. Collars 77 are normally held in position by compression spring 81, one end of which impinges against metal washer or allocating collar 82, and the other end of which impinges against a similar collar 83 seated on insulating disc 84. Insulating member 85 is supplied with suitable notches for allocating members 79 and 80 and is also supplied with a recess 86 receiving the several conductors 87 of cable 88 extending through said insulating member 75. Metal sleeve 72 is suitably secured to flange member 89 having dirt protecting upstanding portion 90. Circuit controller 70 is preferably suitably secured to bracket 41.

Referring to Fig. 7, showing another embodiment of the invention, modified accelerator pedal 91 includes gear sector portion 92 meshing with gear sector portion 93 of operating lever 94 pivotally secured to link 95, one end of which is slidable in boss 48 of throttle valve lever 15 and the other end of which is pivoted to lever 94 by pin 96. Collar 97 rigidly secured to rod 95 is normally arranged to impinge on boss 48 by the action of spring 98 interposed between said boss 48 and adjusting nuts 49. Lever 94 is pivoted on stud 94a.

Referring to Fig. 8, showing a modified accelerator unit, accelerator 91 is arranged to have the sector 92 thereof engage a pinion 100 which is rotated substantially one complete revolution upon the operation of lever 91 from fully released to fully depressed positions or upon the reverse of said movement between said positions. Pinion 100 supported on stud 101 is arranged to rotate operating lever 102. It is to be noted that said lever is so positioned during the extreme released and depressed positions of accelerator pedal 91, that the axis of the operating link or rod 95 intersects the axis of stud 101. By this arrangement a comparatively small movement of the throttle valve occurs with respect to movement of pedal 91, during the initial and extreme movements thereof. This permits comparatively large movement of accelerator pedal 91 during the normal driving periods of a vehicle and therefore relieves the tension of the operator in attempting to make minute movements of said pedal as is the present prevailing rule. This comparative movement of accelerator pedal 91 and throttle valve lever 15 will be understood without entering into a discussion of sines or co-sines of angles. This arrangement has the further advantage that an operator may remove his foot from the pedal whereupon the motor will return to idling speed, then depress said pedal for accelerating said motor to maximum speed and thereafter further depress said pedal for decelerating said motor speed, and simultaneously depressing button 71 for applying the brakes and cancelling the operation of said motor where the circuit controllers 79 are employed for cancelling the ignition of said motor.

Referring to Fig. 11, showing a modified form of balancing unit 30 preferably to be employed on newly manufactured cars, clutch pedal 110 is rotatably supported on clutch operating shaft 111, suitable collars being supplied on each side of said lever for preventing axial movement on said shaft. Collar 112 is fixed to shaft 111 by set screw 113 or a suitable taper pin, said collar having pin or extension 114 engaging one end of compression spring 115. The other end of said spring engaging the extension of lever 110. Spring 115 is normally under tension and arranged to rotate lever 110 clock-wise with respect to shaft 111 until stop member 117 formed on said lever engages stop member 118 of collar 112.

Referring to the chart shown in Figs. 9 and 10. The ordinates of these charts represent pedal travel or rotation of shaft 4 whereas the abscissas represent engagement between the clutch engaging members. Fig. 9 represents the curve of clutch engagement of conventional clutches. The point X representing initial engagement of opposite members of the clutch and the point Y representing full engagement between said members. It will be noted from Fig. 9 that the period of engagement of conventional clutches represented by A is comparatively short and therefore an operator must have a very sensitive response in order to permit a clutch to engage without producing a jerking movement of the vehicle. One customary practice is to permit the clutch to engage and then quickly disengage and again re-engage said clutch as represented by the dotted line Z, this practice being effected in certain power operated devices now in use. However, since the period of engagement corresponding to A is not changed, a very fine adjustment between the mechanism affecting this double clutch engagement and the clutch mechanism must be maintained since maladjustment between these elements would either permit the clutch to engage before said mechanism is effective to produce the softening effect or after said softening effect has taken place.

Fig. 10 illustrates the clutch engagement obtained by this invention, the initial clutch engagement occurring at X and the final clutch engagement occurring at Y, the period of clutch engagement being represented by B and since the period of clutch engagement represented by B is many times that represented by A, maladjustment between a power operated clutch mechanism and the clutch mechanism per se does not materially affect the operation of obtaining soft engagement of said clutch mechanism.

It is to be understood that in using the term "clutch" is meant a unit having driving and driven elements normally engaged by movable members including a spring, acting to effect engagement between said driving and driven members, said movable members being arranged to effect this engagement therebetween, upon movement of said movable members, the driving elements being driven by the motor of vehicle 1, and the driven elements acting to effect propulsion of said vehicle through the wheels 7 thereof.

Assume the driving and driven elements of the clutch are to be disengaged and re-engaged by power operated device shown in Fig. 2, and assuming further that the clutch is in engaged position as shown in said figure, vacuum produced in cylinder 24, by operation of valve 26, acts to move piston 25 to the left. During the initial movement of piston 25, corresponding to the portion of pressure curve P from the left margin of the chart to the point X, and which also corresponds to the slack motion portion of the clutch lever travel, said piston, unit 30 and clutch lever move substantially synchronously. As soon as clutch lever 20 begins to effect disengagement of said driving and driven members, and thereby beginning to overcome the comparatively high pressure of the clutch spring, the clutch lever ceases movement and the continued movement of piston 25 to the left acts to compress spring 33. Preferably just prior to the full compression thereof, clutch lever 20 again begins to rotate counterclockwise, moving synchronously with the continued movement of piston 25 until said piston has reached the end of its stroke. As soon as clutch lever 20 again begins to rotate counterclockwise, the driving and driven elements of said clutch begin to disengage, the full disengagement being effected in a comparatively short travel of piston 25 as represented by A of Fig. 9. Upon release of vacuum in cylinder 24 by reversed operation of valve 26, piston 25 and balancing unit 30 move to the right at a substantially uniform rate of travel, clutch lever 20 rotating clockwise and moving substantially synchronously therewith until the driven elements of said clutch begin to engage the driving elements thereof, whereafter the clock-wise rotation of clutch lever 20 begins to retard with respect to the movement of piston 25 and connecting rod 35 secured thereto, whereupon spring 33 begins to extend. At the point of initial engagement of the driving and driven elements, the pressure of spring 33 and the pressure of the spring effecting engagement of said driving and driven elements is substantially proportionally balanced, all lever connections between said lines of pressure being considered. Whereas the engaging pressure between said driving and driven element, is substantially nil when initially engaged, as spring 33 extends, this pressure becomes gradually greater. Referring to Fig. 10, the distance of pressure curve P from the left margin of the chart to the point X represents a travel of piston 25, unit 30 and clutch lever 20 substantially in synchronism. As said driving and driven elements engage, and spring 33 extends, the engaging pressure between said driving and driven elements builds up as shown by the portion of pressure curve P extending between points X and Y corresponding to a clutch lever travel B, which it will be noted, is several times greater the corresponding travel A of a conventional clutch engaging mechanism shown in Fig. 9. Point Y on curve P represents full engagement of said driving and driven elements, and the remainder of said curve to the right of point Y, represents the substantially synchronous movement of piston 25, balancing unit 30 and clutch lever 20 after full engagement of said driving and driven elements, corresponding to the lost motion between said driven elements and said parts of the mechanism effecting engagement and disengagement thereof between said driving elements.

Assume that it is desired to manually effect disengagement and re-engagement of the driving and driven elements at the same time producing soft engagement therebetween. Disengagement of said elements is effected by depressing foot pedal 21 thereby compressing spring 21c, one end of which impinges on collar 21b, formed on square shaft 21a, extending through square opening 21d, of housing 21e, suitably secured to clutch lever 20. Prior to full compression of spring 21c, said lever 20 begins to rotate counterclockwise and effect disengagement of said clutch, as more fully hereinbefore described. Upon gradually releasing the manual pressure on foot pedal 21, and gradually retracting the operator's foot thereon, both said clutch lever and said foot pedal move clock-wise substantially synchronously until the driving and driven elements of said clutch begin to engage, whereupon the movement of lever 20, begins to retard with respect to the movement of foot pedal 21, thereby effecting a soft engagement of said driving and driven elements, the full engagement therebetween being effected when collar 21b again seats in housing 21e.

Referring to Fig. 11 the function of coiled spring 115 is similar to that of spring 33, the mechanism shown in this figure being a balancing unit corresponding in function to unit 30, however, being modified with respect to location, said balancing unit being placed between a clutch lever, as 110, and a clutch operating shaft, as 111, corresponding to shaft 4 of Figs. 2 and 3. When employing this form of balancing unit or mechanism, for power operation, piston 25 is preferably directly link connected to the clutch lever, as 110, the balancing unit, as 30, being omitted. As hereinbefore stated, this form of balancing unit is to be preferred when said balancing units are incorporated in newly manufactured motor driven vehicles, wherein soft clutch engagement is desired by either power, or manual operation of a clutch lever, as 110, the foot pedal 21 being formed integrally with clutch lever 110, and in which instance the auxiliary manually operated balancing unit parts 21a, 21b, 21c, 21d and 21e are omitted.

Referring to Figs. 3, 5 and 6, accelerator pedal 40 is normally returned to released position by a comparatively weak spring 29 and normal operation of said accelerator comprises in moving a foot portion from released position as shown until boss 44 engages button 71 of circuit controller 70 at which time the throttle valve is in full open position and lever 15 engages stop 17 pedal 40, being normally operated between these positions for operation of vehicle 1. Spring 81 of circuit controller 70 is normally under compression and of a comparatively higher tension than spring 29 and therefore even though the foot extension 43 be depressed against button 71 with considerable pressure circuit controller 70 will not be normally operated, if however an excessive pressure is exerted on extension 43, as for example if the operator believes he is depressing the brake pedal, accelerator 40 will further move in clock-wise rotation thereby depressing button 71 and opening the ignition circuit as more fully hereinafter described. Since throttle valve lever 15 engages stop 17 the aforesaid further rotation of accelerator pedal 40 will act to move rod 46 and collar 51 to the left thereby compressing spring 50 and moving adjusting nuts 49 away from boss 48. Simultaneously with the aforesaid movement of button 71 and rod 46, rod 55 is also moved to the left. It is to be noted that when throttle valve lever 15 has been moved to the full open position and engages stop 17, that adjusting nuts 59 on rod 55 will engage, or be in close approximation to, boss 60, therefore the additional rotation of accelerator lever 40 in operating button 71 will cause adjusting nuts 59 to engage and move lever 57 in counter-clock-wise direction thereby moving brake rod 11 and applying brakes to the vehicle. Also upon depressing button 71, solenoid 53 is energized thereby moving armature 52 to the left and exerting a pull on rod 55 additional to that furnished by accelerator pedal 40, as will be more fully hereinafter described.

Referring to Fig. 6, battery 120 supplies energy through ignition switch 121 to contacts 79—79 of circuit controller 70 and thence to ignition system 122 of said vehicle 1. Energy from switch 121 is also supplied to normally open contacts 80—80 and thence to solenoid 53 and normally open circuit controller 54, said last named circuit controller controlling flow of energy to horn 123 of said vehicle. As shown ignition system 122 will be normally energized upon closing ignition switch 121, however upon depressing button 71 of circuit controller 70, the plunger unit 76 is moved downwardly thereby establishing a circuit between circuit closers 80—80 to solenoid 53 and energizing the same. Upon energizing said solenoid and moving armature 52 thereinto, circuit controller 54 establishes a circuit to horn 123 causing its operation providing switch 124 is closed. Horn 123 is also controlled by the usual horn button 125.

Referring to Fig. 7, the throttle valve is closed to the idling position upon movement of lever 94 to either of the extreme positions C—C shown and is fully open when said lever is in the "0" position, namely, when said lever 94 and rod 95 are in alignment. Upon initially depressing lever 91 from the fully released position shown, lever 94 acts to open the throttle valve, moving lever 15 away from stop 16 toward stop 17. After lever 91 has been depressed substantially one-half way, said throttle will be fully open and lever 15 engaging stop 17. Further depressing lever 91 until boss 44 engages button 71, will act to move lever 94 from the "0" position to the lower C position thereby moving lever 15 from stop 17 to stop 16 and closing the throttle valve to the idling position. It is to be noted that in this form, lever 15 has a comparatively rapid movement with respect to lever 91 during the initial movement of said last named lever from either the fully released or depressed positions of lever 91, and conversely lever 15 has a comparatively slow movement with respect to lever 91 during its median travel of said last named lever. This form is therefore preferable for use on vehicles whose operators are normally driving said vehicles in the higher speed brackets.

Referring to Fig. 8, as hereinbefore described lever 1 has a comparatively large travel with respect to lever 15 during the initial and depressed positions thereof and a comparatively slow rate of travel with respect to lever 15 during the median travel thereof and this form of accelerator control is to be preferred by operators who drive their cars within the lower speed brackets, especially if they are compelled so to do by traffic regulations.

It is to be understood that upon the compression of the balancing springs, as 21c, 33 and 115 they will preferably exert a pressure approximating the pressure exerted upon the operating parts acted upon by the pressure of the clutch spring when the clutch is being engaged.

It is to be noted that when the circuit controller 54 is employed, horn 123 is automatically energized upon depressing button 71 in emergency or inadvertently.

For more full understanding, the periods of travel of the clutch operating mechanism during movement thereof prior to initial disengaging and after full disengagement or prior to initial engaging and after full engagement of said driving and driven elements of the clutch will be termed the lost motion periods and the periods of travel thereof from initial disengagement to full disengagement, or initial engagement to full disengagement of said elements will be termed the engaging periods.

It is to be understood that the compressed pressure of balancing spring 33 when in the extended position as shown is preferably greater than the tension of lost motion spring 25' whereby the clutch lever 20 and the operating members of power operated device 23 will move substantially synchronously during the lost motion period prior to the initial disengaging of the driving and driven elements of the clutch as piston 25 moves to the left, said clutch lever and operating members also move substantially synchronously after the full engagement of said driving and driven elements as said piston moves to the right.

It is to be understood that during the disengaging and re-engaging movement or period of the driven elements with respect to the driving elements of said clutch on vehicle 1, corresponding to the travel or movement portion A of power curve P, Fig. 9, and which also corresponds to the travel or movement of clutch lever 20, neglecting the lost motion or travel periods, the movement of the operating mechanism or member of the power operated device 23, as for example the piston 25 and connecting rod 35, has a travel or movement corresponding substantially to the portion B of power curve P in Fig. 10, and therefore a variable relative movement occurs between said clutch lever 20 and the mechanism operated thereby, as for example, said piston and connecting rod, said variable relative movement or travel being effected by the compression of spring 33 during the disengaging and re-engaging periods of said driving and driven elements.

Clutch lever 110 is rotated under tension of a comparatively weak spring, not shown, during the lost motion period thereof after full clutch engagement.

Whereas I have shown the preferred embodiments of the invention in the drawing, it will be obvious to those skilled in the art that modifications thereof may be made without departing from the spirit of the invention.

What I claim is:

1. The combination with a motor vehicle having an operating motor and propulsion wheels, of a clutch connecting said motor and wheels, a braking mechanism for stopping said vehicle, an ignition system for supplying ignition to said motor, accelerator mechanism including a fuel feed device for supplying fuel to said motor, an accelerator pedal having a speed control range of travel and an emergency range of travel, the emergency range of travel forming an extension of the maximum fuel feed end of said speed control range of travel normally positioned at the minimum fuel feed and of said speed control range of travel, means controlled by said accelerator pedal actuating said accelerator mechanism for varying the fuel feed by said device upon operation of said pedal from normal position throughout said speed control range of travel, and means also controlled by said pedal for (1) disconnecting said clutch, (2) applying said brake mechanism to stop the vehicle, and (3) cancel said ignition supply to said motor upon operation of said pedal from said speed control range of travel into said emergency range of travel.

2. In apparatus for controlling the operation of motor vehicles having a motor and clutch, an ignition system for supplying ignition to said motor, power operated mechanism for operating said clutch between engaged and disengaged positions, accelerator mechanism controlling the speed of said motor operative between minimum and maximum speed positions of said motor, an accelerator pedal having a normal operating range between minimum and maximum motor speed positions and an emergency operating range extending beyond said maximum speed position thereof, and means controlled by said pedal for rendering said power operated mechanism operative to engage said clutch upon initial movement thereof from minimum speed position toward said maximum speed position and maintain engagement of said clutch during continued movement of said pedal toward said maximum speed position and cancel supply of ignition to said motor upon a further continued movement thereof from said maximum speed position into said emergency operating range.

3. The combination with a motor vehicle having a propulsion motor of accelerator mechanism including an accelerator pedal operated between two extreme positions for controlling the speed of said motor, means including a combustible mixture device and a throttle valve member moved between idling and maximum power positions for increasing and decreasing the power of said motor, and means operatively connecting said throttle valve member actuated by said accelerator mechanism for moving said throttle valve member from the idling position to the maximum power position during the movement of said accelerator pedal from either of said extreme positions thereof to a median position thereof and move said throttle valve member from the maximum power position to the idling position upon movement of said accelerator pedal from said median position to either of said extreme positions thereof.

4. In apparatus for controlling the operation of motor vehicles, a clutch having an operating member, an ignition system for said motor, accelerator mechanism operated between minimum and maximum positions for varying the speed of said motor operation between minimum and maximum speeds thereof, an accelerator pedal having a normal operating range extending between minimum and maximum motor speed positions for operating said accelerator mechanism between minimum and maximum speed positions and an emergency operating range extending beyond said maximum speed position of said mechanism, and means controlled by said accelerator pedal permitting operation of said ignition system to supply ignition to said motor during the operation of said pedal between said minimum and maximum speed positions thereof arranged to cancel the operation of said ignition system when said pedal is operated into said emergency range thereof, said accelerator pedal having the same general direction of movement in both ranges of travel.

5. In apparatus for controlling the operation of motor vehicles having an operating motor and a braking system, an ignition system for supplying ignition to said motor, accelerator mechanism for varying the speed of said motor operated between minimum and maximum motor speed positions, an accelerator pedal having a normal operating range between minimum and maximum motor speed positions for operating said mechanism between said minimum and maximum speed positions thereof and an emergency operating range extending beyond said maximum speed position thereof, and means controlled by said accelerator pedal for permitting said ignition system to supply ignition to said motor and release of said braking system during the operation of said pedal within said normal operating range arranged to cancel supply of said ignition by said ignition system and render said braking system operative to apply brakes when said pedal is operated into said emergency operating range thereof.

6. In apparatus for controlling the operation of motor vehicles having an operating motor and a braking system, accelerator mechanism for varying the speed of said motor operated between minimum and maximum speed positions, an accelerator pedal having a normal operating range extending between minimum and maximum motor speed positions thereof for operating said mechanism between minimum and maximum speed positions and an emergency operating range extending beyond said maximum speed position thereof, means controlled by said pedal permitting release of said braking system during the operation of said pedal between said minimum and maximum speed positions thereof arranged to render said braking system operative to apply brakes to said vehicle when said pedal is operated in said emergency operating range, means including a comparatively weak spring normally urging said pedal to the minimum speed position during the movement thereof between minimum and maximum speed positions, and means including a comparatively stronger spring than said first named spring for urging said pedal to said maximum speed position thereof during its movement within said emergency range whereby said pedal will be normally operated within said speed control range.

7. In apparatus for controlling the operation of motor vehicles having an operating motor and brake mechanism, accelerator mechanism for varying the speed of said motor operated between minimum and maximum motor speed positions, an accelerator pedal having a normal operating range extending between minimum and maximum motor speed positions for operating said mechanism between said minimum and maximum speed positions and an emergency operating range extending beyond said maximum speed position, and means including lost motion apparatus permitting said brake mechanism to remain in released position during operation of said pedal between said minimum and maximum speed positions arranged to render said brake mechanism operative to stop said vehicle when said pedal is operated within said emergency operating range thereof.

8. In apparatus for controlling the operation of motor vehicles having an operating motor and a clutch, a braking system for stopping said vehicle, a power operated mechanism for operating said clutch between engaged and disengaged positions, accelerator mechanism operated between minimum and maximum speed positions for varying the speed of said motor between minimum and maximum speed operation, an accelerator pedal having a normal operating range extending between minimum and maximum speed positions and an emergency operating range extending beyond said maximum operating position of said normal operating range, means controlled by said pedal for rendering said power operated mechanism operative to engage said clutch during the initial operation of said pedal from its minimum position and maintain said clutch engaged throughout its continued operation thereof toward said maximum speed position, and means controlled by said pedal permitting release of said braking system during the operation thereof between said minimum and maximum positions arranged to render said system operative to apply brakes to said vehicle upon operation of said pedal byond said maximum speed position into said emergency range of travel thereof.

9. In apparatus for controlling the operation of motor vehicles, a clutch, power operated mechanism operative to disengage and re-engage said clutch normally permitting engagement thereof, accelerator mechanism having a normal operating range between minimum and maximum speed positions for varying the speed of said vehicle between minimum and maximum speed and an emergency operating range extending beyond said maximum speed position, means resiliently resisting the operation of said accelerator mechanism from minimum to maximum speed positions, other resilient means resisting the operation of said accelerator mechanism during operation beyond said maximum speed position in said emergency range, said last-named resilient means having a greater resilient resistance to the operation of said accelerator mechanism than said first-named resilient means, and means responsive to operation of said accelerator mechanism beyond said maximum speed position for rendering said power operated mechanism operative to disengage and re-engage said clutch.

10. In apparatus for controlling the operation of motor vehicles, a clutch, power operated mechanism operative to disengage and re-engage said clutch normally effecting engagement thereof, accelerator mechanism including an accelerator pedal having a normal operating travel between minimum and maximum speed positions for varying the speed of said vehicle between minimum and maximum speed and an emergency travel extending beyond said maximum speed position, and means responsive to travel of said accelerator mechanism within said emergency travel range for rendering said power operated mechanism operative to disengage and re-engage said clutch.

11. In apparatus for controlling the operation of motor vehicles, an operating motor including an ignition system therefor, accelerator mechanism including an accelerator pedal movable between opposite minimum speed positions through an intermediate maximum speed position for controlling the speed of said vehicles, and means responsive to the movement of said accelerator mechanism beyond one of said minimum speed positions for cancelling the operation of said ignition system.

OSCAR A. ROSS.